May 13, 1958     L. C. NEUFELD ET AL     2,834,296
PUMP UNIT FOR WINDSHIELD CLEARING SYSTEMS
Filed Nov. 23, 1953
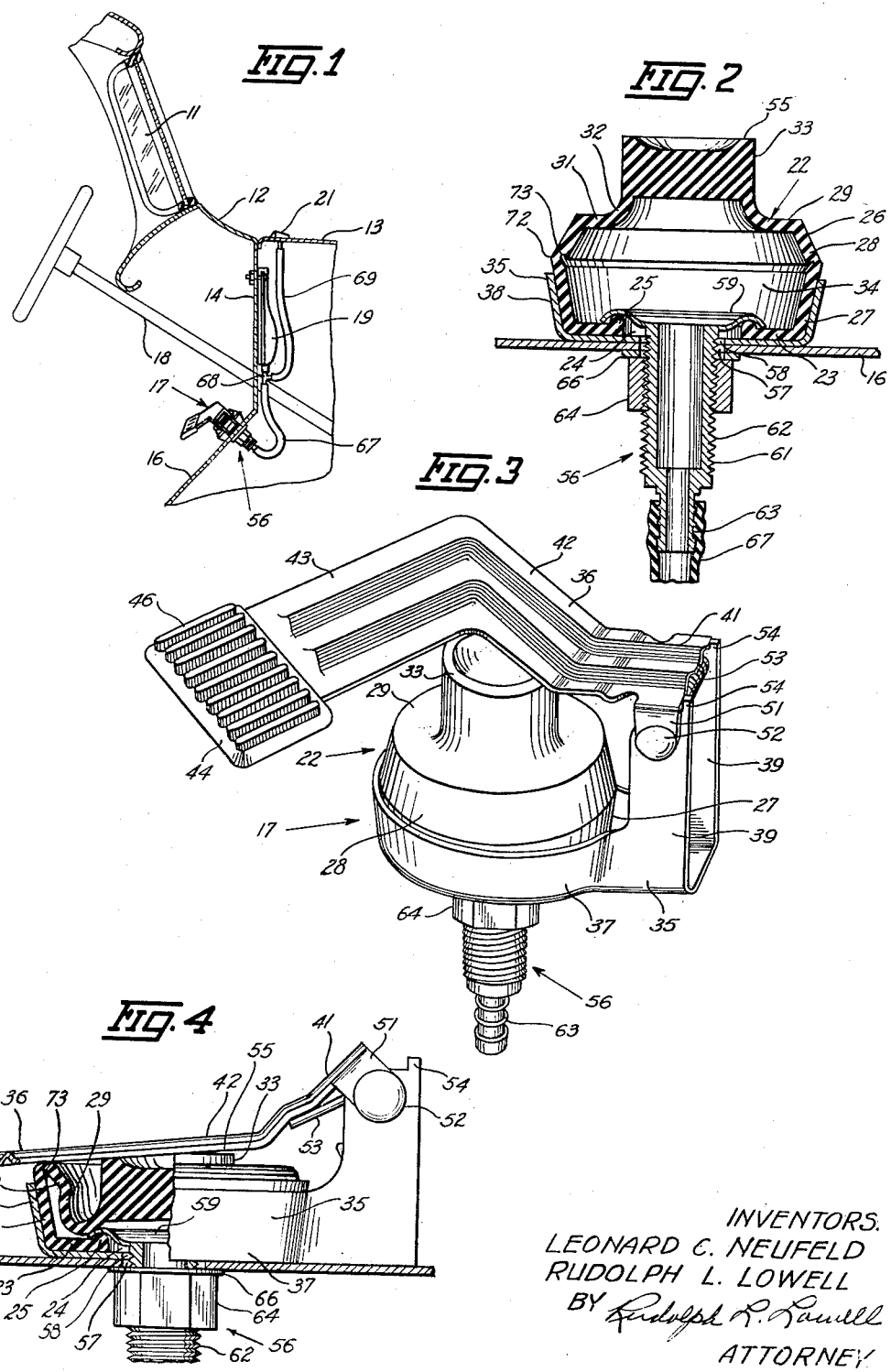
INVENTORS.
LEONARD C. NEUFELD
RUDOLPH L. LOWELL
BY Rudolph L. Lowell
ATTORNEY

United States Patent Office 2,834,296
Patented May 13, 1958

2,834,296

PUMP UNIT FOR WINDSHIELD CLEARING SYSTEMS

Leonard C. Neufeld and Rudolph L. Lowell, Des Moines, Iowa, assignors to The Delman Company, Cookeville, Tenn., a corporation of Tennessee Application November 23, 1953, Serial No. 393,826

3 Claims. (Cl. 103—148)

This invention relates generally to vehicle windshield clearing systems and more particularly to a pump unit in such a system.

An object of this invention is to provide an improved pump unit for use in a vehicle windshield clearing system.

A further object of this invention is to provide a pump unit for a windshield clearing system in which a working member is constructed of a flexible material and is operated by direct manual pressure on one of the walls thereof.

Another object of this invention is to provide a pump unit for a vehicle windshield clearing system which includes a collapsible member constructed of a flexible material and of a configuration such that the member is movable to a collapsed position in which substantially all of the fluid therein is forced therefrom.

A further object of this invention is to provide a pump unit in which a flexible member carried between a pair of hinged members is compressed between the hinged members to a collapsed position to eject fluid therein outwardly of the pump unit.

A further object of this invention is to provide a pump unit for a vehicle windshield clearing system which is compact and rugged in construction, economical to manufacture, and efficient in operation to force fluid under pressure through the system.

Further objects, features and advantages of this invention will become apparent from a consideration of the following description when taken in connection with the accompanying drawing in which:

Fig. 1 is fragmentary foreshortened longitudinal sectional view of an automobile showing a windshield clearing system, embodying the pump unit of this invention;

Fig. 2 is an enlarged transverse sectional view of a portion of the pump unit of this invention, showing the collapsible working member therefor in an expanded or fluid full position;

Fig. 3 is an enlarged perspective view of the pump unit of this invention; and

Fig. 4 is an enlarged side elevational view of the pump unit with some parts broken away and other parts shown in section for the purpose of clarity and showing the working or body member in a collapsed or fluid empty position.

With reference to the drawing, there is illustrated in Fig. 1 a windshield clearing system as applied to an automobile having a windshield 11, an engine cowl 12, and an engine hood 13 positioned forwardly of the cowl 12. The automobile is further equipped with a usual fire wall 14 and an upwardly and forwardly inclined floor or toe board section 16 which joins with the lower end of the fire wall 14.

The windshield clearing system includes a pump unit, indicated generally at 17, positioned on the top side of the toe board section 16, adjacent the automobile steering column 18, and a fluid reservoir or container 19 supported on the front side of the fire wall 14. The fluid from the reservoir 19 is supplied to a fluid discharge nozzle 21, illustrated as supported on the automobile engine hood 13 for directing jets of fluid onto the windshield 11 and into the path of movement of the usual windshield wipers (not shown).

The pump unit 17 (Figs. 2, 3 and 4) consists of a generally dome-shape body or working member 22 constructed of a flexible material such as rubber or the like. The body member 22 has a flat bottom wall 23 formed with a central opening 24 bounded by an upwardly extended peripheral projection 25.

The side wall 26 of the flexible member 22 is of an irregular contour (Fig. 2) and includes a first or lower section 27, inclined upwardly and outwardly from the periphery of the bottom wall 23, and a second or upper section 28 inclined upwardly and inwardly from the upper end of the lower section 27.

The body member top wall 29 has a portion 31 extended inwardly from the upper end of the upper side wall section 28 in a plane substantially parallel with the bottom wall 23. The portion 31, of the top wall 29, terminates in an inwardly and upwardly curved portion 32, which in turn is integrally connected or formed with an upwardly projected cylindrical boss 33, which constitutes a central portion of increased thickness for the top wall 29. The side wall 26, top wall 29, and bottom wall 23 thus define a fluid chamber 34 having the single opening 24 arranged below the projection or boss 33, which is of a diameter slightly larger than the diameter of the opening 24.

It is seen, therefore, that the bottom wall 23 and lower side wall section 27 constitute a flexible and hollow body member section which, with a similar oppositely disposed section consisting of the top wall 29 and upper side wall section 28, enclose the fluid chamber 34.

The flexible member 22 is carried between a pair of hinged members 35 and 36 (Figs. 1, 3 and 4), with the member 35 acting as a base or support and the member 36 as an actuating lever. The base member 35 is formed at one end with a dish shaped portion 37 having a side wall 38 of a size and shape to receive therein, in a nested relation, the lower wall section 27 of the side wall 26 of the flexible member 22.

At its opposite end, the base member 35 is formed with a pair of upright transversely spaced L-shaped extensions 39 formed integral with opposite portions of the base side wall 38.

The actuating lever 36 is of an irregular shape and includes a first end section 41 which is substantially parallel to the dish shaped base portion 37 in the position of the lever 36 illustrated in Fig. 3. An intermediate or body member engaging section 42 of the lever 36 is inclined upwardly relative to the end section 41 and a second end section 43 is extended upwardly and laterally relative to the sections 41 and 42. A rubber foot pad 44 received on the terminal end of the section 43 has parallel projections 46 on its top side to facilitate the engagement of the operator's foot with the lever 36.

The lever end section 41 (Fig. 3) terminates in downwardly projected spaced ears 51 which straddle the upper ends of the extensions 39 on the base member 35. A pivot member 52, extended through the ears 51 and the extensions 39, provides for an up and down pivotal movement of the lever 36 relative to the base 35. Coiled about the pivot 52 is a torsion spring 53 which acts to bias the lever end section 41 into engagement with upright stops 54 on the upper ends of the extensions 39.

It is seen, therefore, that on application of a downward foot pressure on the foot pad 44, the lever 36 is swung downwardly about the pivot 52 against the action of the spring 53. The intermediate section 42 of the lever 36 contacts the upper end 55 of the boss 33 on the body member 22 and progressively moves the boss 33 downwardly until the body member 22 is fully collapsed as illustrated in Fig. 4.

In the assembly of the pump unit 17 with the windshield clearing system (Fig. 1), the base member 35 is positioned on the top side of the toe board 16 such that the lever 36 is arranged for convenient operation by the operator's foot. A holding or clamping unit 56 (Fig. 2) extends through openings 57 and 58 in the toe board 16 and base 35, respectively, and the opening 24 in the body member 22. An annular plate portion 59 on the upper end of the unit 56 is arranged within the fluid chamber 34 centrally of the bottom wall opening 24 and in contact with the upper end of the projection 25 which surrounds the opening 24.

Formed integral with and extended downwardly from the plate portion 59 is an elongated hollow stem section 61 which has an upper externally threaded portion 62 and a lower reduced portion 63. A nut 64, advanced on the threaded portion 62 into engagement with a washer 66 positioned against the underside of the toe board 16, maintains the pump unit 17 in a firmly supported position on the toe board 16.

It is seen, therefore, that the pump unit 17 is readily secured to the toe board 16 by virtue of the body member bottom wall 23 and the base 35 being clamped to the toe board 16 between the plate portion 59 and the nut 64 on the clamping unit 56.

One end of a flexible tube 67 (Figs. 1 and 2) is positioned on the lower portion 63 of the stem 61, and the other end of the tube 67 is connected to a valve unit 68 carried by the fluid reservoir 19. The valve unit 68 is of the well known type shown in Eaddy Patent No. 2,126,624 and merely includes a pair of one-way check valves (not shown) one of which provides for a flow of fluid from the reservoir 19 to the tube 67, and the other providing for flow of fluid from the tube 67 to the tube 69. The fluid chamber 34 for the pump unit 17 is thus in fluid communication through the stem 61 and the flexible tube 67 with the valve unit 68. A flexible tube 69 connects the valve 68 with the discharge nozzle 21 for supplying the nozzle with fluid.

In the operation of the vehicle windshield clearing system, the vehicle driver positions a foot on the top side of the rubber pad 44 for the pump actuating lever 36 (Figs. 1 and 3) and exerts a downward pressure thereon so as to swing the lever 36 downwardly about the pivot 52. As a result of the contact of the lever section 42 with the projection 33 on the body member top wall 29, downward swinging movement of the lever 36 moves the top wall 29 toward the bottom wall 23, with a resultant collapsing movement of the side wall 26. Thus the top wall projection 33 constitutes an actuating member for the body member 22 for moving the top wall 29 toward the bottom wall 23 during the operation of the pump unit 17. By virtue of the inclination of the lever section 42 relative to the actuating member 33, in the position of the lever shown in Fig. 3, the member 33 is moved in a substantially straight line path toward the bottom wall 23 during operation of the pump unit 17, without any appreciable sliding movement of the lever section 42 across the top end 55 of the actuating member 33.

On downward movement of the actuating member 33, the body member side wall section 28 (Figs. 2 and 4) is swung downwardly relative to the side wall section 27 about the juncture 72 of these sections. Such movement is facilitated by an upwardly and outwardly directed groove or score 73 formed on the inner side of the side wall 26 opposite the juncture 72. The groove 73 thus permits the section 28 to be folded toward the section 27 so that the juncture 72 of these sections, which is of a reduced thickness by virtue of the groove 73, functions as a flexible hinge.

In the fully collapsed position of the body member 22 (Fig. 4) the top wall portion 32 contacts the top side of the annular plate 59 to thereby prevent further movement of the lever 36 and indicate to the operator that the pumping operation for the pump unit 17 has been completed. As a result of the side wall section 27 being maintained against outward movement by the wall 38 of the base 35 (Fig. 4) the side wall section 28 is moved into a substantially nested relation within the section 27.

Thus, in the collapsed position of the body member 22, substantially all of the fluid is exhausted from the fluid chamber 34, with such fluid being continuously expelled under pressure from the chamber 34 during downward swinging movement of the lever 36.

This fluid under pressure is forced through the flexible tube 67 and into the valve unit 68 which is opened by the fluid pressure to admit fluid through the flexible tube 69 to the fluid discharge nozzle 21 concurrently with a closing of the connection of the valve 68 to the fluid reservoir 19. Fluid under pressure from the flexible tube 69 is thus discharged from the discharge nozzle 21 as jets of fluid directed against the windshield 11.

When the operator's foot is removed or released from the lever 36, the torsion spring 53 returns the lever 36 to its position against the stops 54 and the side wall 26, by virtue of its inherent resiliency or flexibility, operates to move the actuating member 33 upwardly away from the bottom wall 23. Upward movement of the member 33 functions to expand the fluid chamber 34 and thus draw fluid from the reservoir 19 into the fluid chamber 34. It can thus be seen, that fluid is discharged from the discharge nozzle 21 when the lever 36 is depressed, and drawn into the pump unit 17 for subsequent discharge when the actuating lever 36 is released. It is to be understood, of course, that the body member 22 may be operated directly without the actuating lever 36, by merely applying direct manual pressure to the top side of the actuating member 33.

From the above description it can be seen that this invention provides a compact pump unit 17 which is attachable directly to the top side of an automobile toe board section 16. The pump unit 17 operates to quickly and efficiently discharge fluid from the discharge nozzle 21 with sufficient pressure to direct such fluid against the windshield 11, and as best appears in Fig. 4 substantially all of the fluid carried by the pump 17 is discharged on each operation thereof.

Although the invention has been described with respect to a preferred embodiment thereof, it is to be understood that it is not to be so limited since changes can be made therein which are within the full intended scope of this invention as defined by the appended claims.

We claim:

1. For use in a vehicle windshield clearing system, a pump comprising a body member formed of a flexible material and having a fluid chamber therein, said body member having a bottom wall, a top wall, and a side wall connected to and extended between said top and bottom walls, said top wall including an inwardly and upwardly curved annular portion connected to said side wall and a cylindrical actuating portion connected to and extended upwardly from said annular portion said side wall having a pair of reversely inclined sections of substantially equal thickness arranged in a diverging relation inwardly of the body member, with the junction of said pair of sections being formed with a groove on the inner side thereof so as to constitute a hinge, whereby on movement of said top wall toward said bottom wall, the top one of said side wall sections is moved downwardly about said hinge to a position within and into a substantially nested relation with the bottom one of said side wall sections.

2. For use in a vehicle windshield clearing system, a pump comprising a hollow body member formed of a flexible material, said body member having a bottom wall, a top wall, and an annular side wall secured to and extended between said top and bottom walls to form a fluid chamber, said side wall including upper and lower wall sections having the juncture thereof positioned outwardly of said top and bottom walls, so that one movement of said top wall toward said bottom wall the upper one of said side wall sections is swung downwardly about said juncture to a position within said lower wall section, actuating means on said top wall and extended upwardly therefrom a distance to provide for a portion of said actuating means being above said body member in the position of said upper side wall section within said lower side wall section, and rigid dish-shaped means including a side wall positioned about and in contact in a nested relation with the outer surface of said lower wall section below said junction to maintain said lower side wall section against outward movement on downward swinging movement of said upper side wall section.

3. A pump unit comprising a hollow body member formed of a resilient material and having a fluid chamber therein, said body member including a bottom wall, a top wall and a side wall connected to and extended between said top and bottom walls, said side wall having upper and lower sections arranged in a diverged relation, such that said upper section is inclined upwardly and inwardly and said lower section downwardly and inwardly, with the juncture of said sections being of a reduced thickness to provide for relative folding of said sections, said bottom wall having an opening in fluid communication with said fluid chamber, whereby on downward movement of said top wall, said upper side wall section is swung downwardly about said juncture, with said top wall being movable toward said bottom wall to a position in which the portions of said body member on opposite sides of the juncture of said side wall sections are arranged in a substantially nested relation whereby to force fluid in said chamber outwardly through said opening.

References Cited in the file of this patent

UNITED STATES PATENTS

| | | | |
|---|---|---|---|
| 224,370 | Wilson | Feb. 10, | 1880 |
| 1,117,779 | Bulmer | Nov. 17, | 1914 |
| 2,012,218 | Burress | Aug. 20, | 1935 |
| 2,476,545 | Hayward | July 19, | 1949 |
| 2,648,288 | Marks | Aug. 11, | 1953 |
| 2,693,766 | Seyler | Nov. 9, | 1954 |
| 2,717,556 | Bartoo | Sept. 13, | 1955 |
| 2,721,027 | Schwartz | Oct. 18, | 1955 |